(12) United States Patent
Chen et al.

(10) Patent No.: US 9,652,147 B2
(45) Date of Patent: May 16, 2017

(54) METHOD AND APPARATUS FOR SHIFTING SOFTWARE INPUT PANEL AND RECORDING MEDIUM THEREOF

(71) Applicant: HTC Corporation, Taoyuan County (TW)

(72) Inventors: Yu-Chuan Chen, Taoyuan County (TW); Hung-I Weng, Taoyuan County (TW)

(73) Assignee: HTC Corportion, Taoyuan County (TW)

( * ) Notice: Subject to any disclaimer, the term of this patent is extended or adjusted under 35 U.S.C. 154(b) by 221 days.

(21) Appl. No.: 14/022,247

(22) Filed: Sep. 10, 2013

(65) Prior Publication Data

US 2014/0013266 A1   Jan. 9, 2014

Related U.S. Application Data

(63) Continuation-in-part of application No. 12/339,096, filed on Dec. 19, 2008, now Pat. No. 8,558,798.

(30) Foreign Application Priority Data

Apr. 15, 2008   (TW) ................................ 97113617 A (51) Int. Cl.
  *G09G 5/00*    (2006.01)
  *G06F 3/0488*  (2013.01)

(52) U.S. Cl.
  CPC ................ *G06F 3/04886* (2013.01)

(58) Field of Classification Search
  CPC .. G06F 9/4443; G06F 3/04886; G06K 9/3258

USPC ........................................ 717/100; 715/773
See application file for complete search history.

(56) References Cited

U.S. PATENT DOCUMENTS

| 7,167,255 | B1  |   | 1/2007 | Mikami et al. |            |
|-----------|-----|---|--------|---------------|------------|
| 7,205,982 | B1  | * | 4/2007 | Kurosawa et al. | ........... 345/168 |
| 2003/0074647 | A1 | * | 4/2003 | Andrew        | ........ 717/100 |
| 2004/0130575 | A1 | * | 7/2004 | Tai et al.    | ........ 345/773 |

(Continued)

FOREIGN PATENT DOCUMENTS

| CN | 1267029       |   | 9/2000  |            |
|----|---------------|---|---------|------------|
| GB | WO2011/131989 | * | 10/2011 | ............. G06F 3/048 |

OTHER PUBLICATIONS

"Office Action of U.S. Appl. No. 12/339,096" issued on Sep. 23, 2011, p. 1-p. 8.

(Continued)

*Primary Examiner* — Li Sun
*Assistant Examiner* — Jasmine Wan
(74) *Attorney, Agent, or Firm* — Jianq Chyun IP Office (57) ABSTRACT

A method and an apparatus for altering a key function of a software input panel (SIP) of an electronic device and a recording medium thereof are provided, wherein the SIP includes a plurality of keys, and the number and layout of the keys are fixed. In the present method, first, an operating interface of an electronic device is switched, wherein the operating interface includes the SIP. Then, each key of the SIP is switched to an input word corresponding to the operating interface. As a result, the input word corresponding to each key of the SIP is automatically altered according to the current operating interface, and accordingly inputting through the SIP is made very convenient.

11 Claims, 7 Drawing Sheets (56) References Cited

U.S. PATENT DOCUMENTS

| | | |
|---|---|---|
| 2007/0025877 A1* | 2/2007 | Hansen .................... 422/68.1 |
| 2008/0055269 A1 | 3/2008 | Lemay et al. |
| 2009/0027724 A1 | 1/2009 | Nagase et al. |
| 2009/0106686 A1* | 4/2009 | Shin .................... H04L 51/04 |
| | | 715/781 |
| 2009/0119553 A1 | 5/2009 | Matsushima |
| 2012/0023453 A1* | 1/2012 | Wagner ............... G06F 3/04886 |
| | | 715/848 |
| 2013/0174079 A1* | 7/2013 | Morley et al. ................ 715/773 |
| 2013/0234945 A1* | 9/2013 | Goktekin ............ G06K 9/3258 |
| | | 345/168 |

OTHER PUBLICATIONS

"Office Action of U.S. Appl. No. 12/339,096" issued on Mar. 29, 2012, p. 1-p. 10.

* cited by examiner

METHOD AND APPARATUS FOR SHIFTING SOFTWARE INPUT PANEL AND RECORDING MEDIUM THEREOF

CROSS-REFERENCE TO RELATED APPLICATION

This application is a continuation-in-part application of and claims the priority benefit of U.S. application Ser. No. 12/339,096, filed on Dec. 19, 2008, now allowed, which claims the priority benefit of Taiwan application serial no. 97113617, filed on Apr. 15, 2008. The entirety of each of the above-mentioned patent applications is hereby incorporated by reference herein and made a part of this specification.

BACKGROUND OF THE INVENTION

1. Field of the Invention

The present invention generally relates to the related applications of a software input panel (SIP), and in particular, to a method and an apparatus for altering a key function of a SIP and a recording medium thereof.

2. Description of Related Art

The term of "context awareness" is first mentioned by Schilit B. N. and Theimer M. M in 1994. According to the concept published by Schilit B. N. and Theimer M. M, context-related services are provided according to information of calculation context, user context, or physical context. In short, context awareness is a technique which allows a device to automatically detect and collect the ambiance and state of a user and accordingly meet the requirement of the user.

Presently, electronic devices integrated with context awareness technique are broadly available in the market. Taking a cell phone with a built-in calendar function as an example, if the user records a meeting schedule in the calendar in advance, whether the current time clashes with the meeting time is determined whenever a call is received and accordingly whether the user is attending the meeting is further determined. If the user is attending the meeting, the incoming call is directly connected to the voice mailbox. As a result, the purpose of automatically filtering incoming calls can be accomplished.

Besides, a mobile electronic device may have a function of automatically changing the display mode of its screen according to the current working state of the device. For example, when a user turns an upright device 90° rightward, the display of the screen is automatically changed to landscape orientation so that the user can still look at the displayed context conveniently. The techniques described above are all applications developed based on the context awareness technique.

While choosing an electronic device, whether the operation thereof is easy to learn is usually considered by the consumer besides the appearance and functions thereof. Thus, how to provide a straightforward and convenient operation pattern based on the context awareness technique has become one of the most important subjects in the development of electronic devices.

SUMMARY OF THE INVENTION

Accordingly, the present invention is directed to a method for altering a key function of a software input panel (SIP), wherein the input word corresponding to each key of the SIP is automatically altered according to a current operating interface of an electronic device, so that the input efficiency can be improved.

The present invention is directed to an apparatus for altering a key function of a SIP, wherein the input word corresponding to each key of the SIP is automatically altered according to different operating interface without changing the number and layout of the keys, so that a user can input data conveniently through the SIP.

The present invention provides a method for altering a key function of a SIP of an electronic device, wherein the SIP includes a plurality of keys with a fixed number and a fixed layout, and each of the keys is corresponding to a plurality of input words. First, an operating interface of the electronic device is switched, wherein the operating interface includes the SIP. Then, each key of the SIP is switched to an input word corresponding to the operating interface.

According to an embodiment of the present invention, the step of switching the operating interface of the electronic device may be switching an executed application program, an input field of an executed application program, a function of an executed application program, or an executed operation mode.

According to an embodiment of the present invention, the electronic device further includes a touch screen for receiving a key selecting instruction so as to select a key of the SIP. The method provided by the present invention further includes receiving the key selecting instruction so as to input the input word corresponding to the selected key at a cursor position of the electronic device after the step of switching each key of the SIP to the input word corresponding to the operating interface.

According to an embodiment of the present invention, the keys of the SIP include a space key, and the input words corresponding to the space key include at least a blank character and a domain name string, wherein the step of inputting the input word corresponding to the selected key at the cursor position further includes inputting the domain name string at the cursor position of the electronic device.

According to an embodiment of the present invention, each of the keys is corresponding to a key display area in the touch screen, wherein the key display area is used for displaying at least one input word corresponding to the key, and the surface area and the shape of the key display area are kept unchanged when the input word is displayed.

According to an embodiment of the present invention, the SIP includes a symbol table switch key for switching a symbol table, wherein the symbol table includes a plurality of input symbols. The method provided by the present invention further includes deleting those input symbols in the symbol table which are not corresponding to the operating interface after the step of switching the operating interface of the electronic device.

The present invention also provides an apparatus for altering a key function of a SIP. The apparatus includes an operating interface switch module and a key function altering module. The operating interface switch module is used for switching an operating interface of an electronic device, wherein the switched operating interface includes the SIP, the SIP has a plurality of keys with a fixed number and a fixed layout, and each of the keys is corresponding to a plurality of input words. The key function altering module is used for switching one of the keys to the input word corresponding to the operating interface.

According to an embodiment of the present invention, the operating interface switch module is used for switching an executed application program, an input field of an executed application program, a function of an executed application program, or an executed operation mode.

According to an embodiment of the present invention, the apparatus provided by the present invention further includes a touch screen for receiving a key selecting instruction, so as to select a key of the SIP.

According to an embodiment of the present invention, the apparatus provided by the present invention further includes a processing module for inputting the input word corresponding to the selected key at a cursor position of the electronic device after the touch screen receives the key selecting instruction, wherein the input word may be a character or a string.

According to an embodiment of the present invention, the keys of the SIP include a space key, and the input words corresponding to the space key include at least a blank character and a domain name string. The processing module is used for inputting the domain name string at the cursor position of the electronic device.

According to an embodiment of the present invention, the apparatus provided by the present invention further includes a SIP rendering module for rendering the SIP, displaying the SIP in the touch screen, and displaying the input word corresponding to each of the keys in the key display area of the key, wherein the SIP rendering module keeps the surface area and the shape of the key display area unchanged when it displays the input word corresponding to each of the keys.

According to an embodiment of the present invention, the SIP includes a symbol table switch key for switching a symbol table, wherein the symbol table includes a plurality of input symbols. The key function altering module is used for deleting those input symbols in the symbol table which are not corresponding to the operating interface.

The present invention further provides a recording medium for recording a computer program, wherein the computer program includes a plurality of program codes. When the computer program is loaded into an electronic device, the electronic device executes the key function altering method for a SIP as described above.

The present invention further provides a method for shifting a software input panel (SIP) of an electronic device, wherein the SIP comprises a plurality of keys, and each of the keys is corresponding to a plurality of input words. In the method, a first operating interface comprising the SIP is displayed, and one of the keys for inputting one or more of the corresponding input words is altered according to the first operating interface. Then, the first operating interface is switched to a second operating interface comprising the SIP. One of the keys for inputting one or more of the corresponding input words is altered according to the second operating interface, and the SIP is shifted to a specific display area according to the second operating interface.

According to an embodiment of the present invention, the step of shifting the SIP to the specific display area according to the second operating interface further comprises resizing or deforming the SIP to fit the specific display area.

According to an embodiment of the present invention, the step of altering one of the keys for inputting one or more of the corresponding input words according to the second operating interface further comprises altering a layout of the keys to rearrange at least one key for inputting one or more corresponding input words in a specific portion of the SIP according to the second operating interface.

According to an embodiment of the present invention, the step of shifting the SIP to the specific display area according to the second operating interface comprises shifting the SIP to leave only the specific portion of the SIP on the specific display area, in which the specific portion comprises at least one upper row, at least one lower row, at least one left column, or at least one right column of the SIP.

According to an embodiment of the present invention, the step of shifting the SIP to the specific display area according to the second operating interface comprises shifting the SIP to the specific display area according to a location of an input field of the second operating interface.

The present invention further provides an apparatus for shifting a SIP. The apparatus includes an operating interface switch module, a key function altering module, and a SIP shifting module. The operating interface switch module is used for switching an electronic device from a first operating interface comprising the SIP to a second operating interface comprising the SIP, in which the SIP having a plurality of keys. The key function altering module is used for altering one of the keys for inputting one or more of the corresponding input words according to the first operating interface when the first operating interface is displayed, and for altering one of the keys for inputting one or more of the corresponding input words according to the second operating interface when the second operating interface is displayed. The SIP shifting module is used for shifting the SIP to a specific display area according to the second operating interface when the second operating interface is displayed.

According to an embodiment of the present invention, the SIP shifting module further resizes or deforms the SIP to fit the specific display area.

According to an embodiment of the present invention, the key function altering module further alters a layout of the keys to rearrange at least one key for inputting one or more corresponding input words in a specific portion of the SIP according to the second operating interface.

According to an embodiment of the present invention, the SIP shifting module shifts the SIP to leave only the specific portion of the SIP on the specific display area, and the specific portion comprises at least one upper row, at least one lower row, at least one left column, or at least one right column of the SIP.

According to an embodiment of the present invention, the SIP shifting module shifts the SIP to the specific display area according to a location of an input field of the second operating interface.

According to an embodiment of the present invention, a quantity, a layout, or both the quantity and the layout of the keys within the SIP are fixed before and after switching.

The present invention further provides recording medium for recording a computer program, wherein the computer program includes a plurality of program codes. When the computer program is loaded into an electronic device, the electronic device executes the key function altering method for a SIP as described above.

In the present invention, the input word corresponding to each of the keys of a SIP is automatically altered according to the current operating interface of an electronic device without changing the number and layout of the keys. Thereby, an input word corresponding to the operating interface is automatically input when a user presses a key of the SIP. As a result, the input efficiency through the SIP is improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
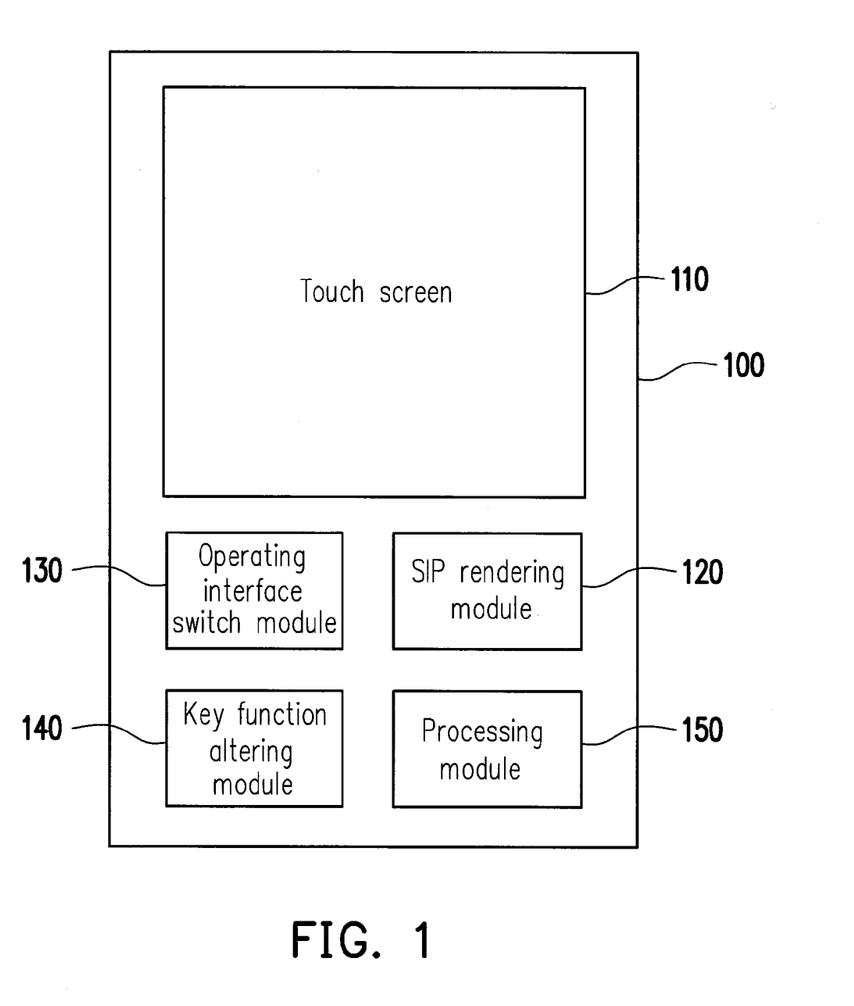
FIG. 1 is a block diagram of an apparatus for altering a key function of a software input panel (SIP) according to an embodiment of the present invention.

FIG. 1 is a block diagram of an apparatus for altering a key function of a software input panel (SIP) according to an embodiment of the present invention. Referring to FIG. 1, in the present embodiment, the apparatus 100 may be disposed in different electronic device, such as a cell phone, a personal digital assistant (PDA), a smartphone, or a computer, for switching an input word corresponding to each key of the SIP according to different operating interface of the electronic device.

The apparatus 100 includes a touch screen 110, a SIP rendering module 120, an operating interface switch module 130, a key function altering module 140, and a processing module 150. The touch screen 110 is used for displaying various images, and other than that, the touch screen 110 is also used for detecting an instruction generated by a touch action of a user and accordingly served as an input interface of the electronic device.

The SIP rendering module 120 is used for rendering the SIP having a plurality of keys on the touch screen 110. In the present embodiment, the SIP may be a full QWERTY keyboard, a compact QWERTY keyboard, or a phone keypad, etc. However, the present invention is not limited thereto. While rendering the SIP, the SIP rendering module 120 displays the input word corresponding to each of the keys in a key display area corresponding to the key in the touch screen 110. In other words, the word displayed in the key display area is the word inputted when the user presses the key.

In the present embodiment, each key of the SIP is corresponding to at least one input word. When a key is corresponding to multiple input words, the SIP rendering module 120 displays either all the input words or only one of the input words in the key display area; however, the number of input words displayed in the key display area is not limited in the present invention. It should be mentioned that when the SIP rendering module 120 displays the corresponding input words in the key display area, it will not change a surface area or a shape of the key display area. Accordingly, the surface area, size, and shape of the SIP can be kept unchanged, and a number and layout of the keys of the SIP are also fixed.

The operating interface switch module 130 is used for switching the operating interface of the electronic device. The switched operating interface includes the SIP having a plurality of keys. The key function altering module 140 is used for switching the key of the SIP to the input word corresponding to the current operating interface. It has to be noted herein that along with the switching of the operating interface, the key function altering module 140 switches each key of the SIP to the input word corresponding to the current operating interface. However, the number and layout of the keys of the SIP are both fixed and will not change along with the corresponding input words thereof.

When the user presses the SIP displayed in the touch screen 110 and accordingly issues a key selecting instruction corresponding to one of the keys, the processing module 150 inputs the input word corresponding to the selected key at a current cursor position of the electronic device.

Figure 2:
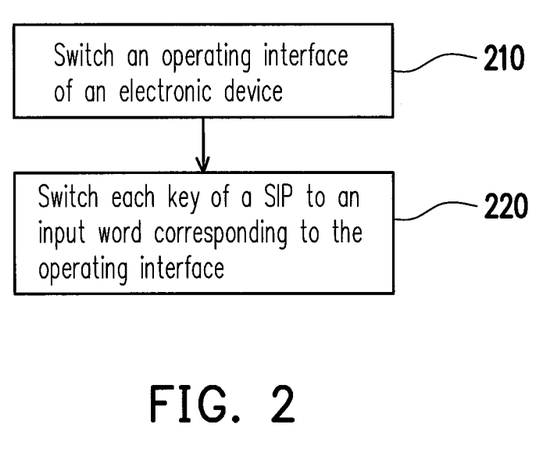
FIG. 2 is a flowchart of a method for altering a key function of a SIP according to an embodiment of the present invention.

Another embodiment of the present invention is described herein in order to further explain the operation of the apparatus 100 in detail. FIG. 2 is a flowchart of a method for altering a key function of a SIP according to an embodiment of the present invention. Referring to both FIG. 1 and FIG. 2, first, in step 210, the operating interface of the electronic device is switched by the operating interface switch module 130. The switched operating interface includes the SIP having a plurality of keys, and each key of the SIP is corresponding to at least one input word, wherein the input word may be a character or a string; however the present invention is not limited thereto.

In the present embodiment, the operation for switching the operating interface of the electronic device includes switching an executed application program or an input field of the executed application program, etc. Taking a smartphone as an example of the electronic device, turning on different application program means switching to different operating interface (for example, switching from a SMS writing application program to a webpage browsing application program). Besides, the image displayed by the webpage browsing application program contains a web address input field and a search field, and the switching between these two input fields are also considered the switching of operating interface.

Additionally, the action of switching the operating interface also includes switching an operation mode (for example, a language mode) or a function of an application program when the application program executed by the electronic device is not changed. For example, an application program with communication function also has a function for text input and message transmission, and it is also considered switching of operating interface of the electronic device when the user switches between these two functions.

After the operating interface is switched, in step 220, the key function altering module 140 switches each key of the SIP to the input word corresponding to the current operating interface. Namely, different input words are inputted along with different operating interface when the user presses the same key. The SIP rendering module 120 displays the input word corresponding to each key in the key display area of the key.

In an embodiment of the present invention, the input word corresponding to a space key of the SIP may be a blank character or a domain name string (for example, ".com", ".org", or ".tw", etc; however, the present invention is not limited thereto). Assuming that the currently executed application program is a webpage browsing application program, when the user switches the input field from a search field to a web address input field, the key function altering module 140 switches the input word corresponding to the space key to the domain name string, and the domain name string is displayed in the key display area of the space key. Accordingly, when the user presses the space key through the touch screen 110 and accordingly generates a corresponding key selecting instruction, the processing module 150 directly inputs the domain name string corresponding to the space key at the current cursor position (i.e. the web address input field).

In another embodiment of the present invention, if the space key is corresponding to more than one domain name string, then the SIP rendering module 120 displays all the domain name strings corresponding to the space key in the key display area of the space key. Thus, when the user switches the input field to the web address input field and presses the space key, the processing module 150 displays all the domain name strings corresponding to the space key at the cursor position in turn, and inputs the last displayed domain name string when the user releases the space key.

The user does not need to use any blank character while inputting a web address. Instead, domain name strings such as ".com", ".org", and ".tw" are always used. Thereby, foregoing domain name strings can be quickly inputted through the method and apparatus provided by the present invention so that it is not necessary to input the characters one by one. As a result, the input efficiency is improved.

It should be stated herein that when the key function altering module 140 switches the function corresponding to a key, it will not change the number or layout of the keys, and when the SIP rendering module 120 displays the corresponding input word in the key display area of each key, it will not change the surface area or the shape of the key display area.

In another embodiment of the present invention, besides switching the input words corresponding to the keys, the key function altering module 140 also establishes a corresponding relationship between each key of the SIP and a specific instruction and switches the corresponding relationship according to different operating interface. The SIP rendering module 120 displays a hint text corresponding to the specific instruction in the key display area of each key and meanwhile, keeps the surface area and the shape of the key display area unchanged. For example, assuming that a key is corresponding to different function start instructions in different operating interfaces, when the user presses the key, the processing module 150 automatically executes a function start instruction corresponding to the current operating interface, so as to start a function corresponding to the operating interface.

In yet another embodiment of the present invention, the SIP further includes a symbol table switch key, and by pressing this key, a symbol table is switched in the touch screen 110. The symbol table includes a plurality of input symbols. The key function altering module 140 deletes those input symbols in the symbol table which are not corresponding to the current operating interface (for example, the input symbol which is not applicable to the current operation interface). For example, when the user switches the input field to the web address input field, the key function altering module 140 deletes those input symbols not applicable to the syntax of web addresses (for example, a EURO symbol) from the symbol table. By deleting those inapplicable symbols, the display space of the symbol table is saved, and at the same time, the user can find a desired symbol quickly.

In another embodiment of the present invention, besides switching the input words corresponding to the keys, the SIP is further shifted to a specific display area so as to prevent a content displayed on the operating interface from being blocked by the SIP, in which the SIP may be further resized or deformed according to the operating interface being switched to. Examples are given below for further illustration.

Figure 3:
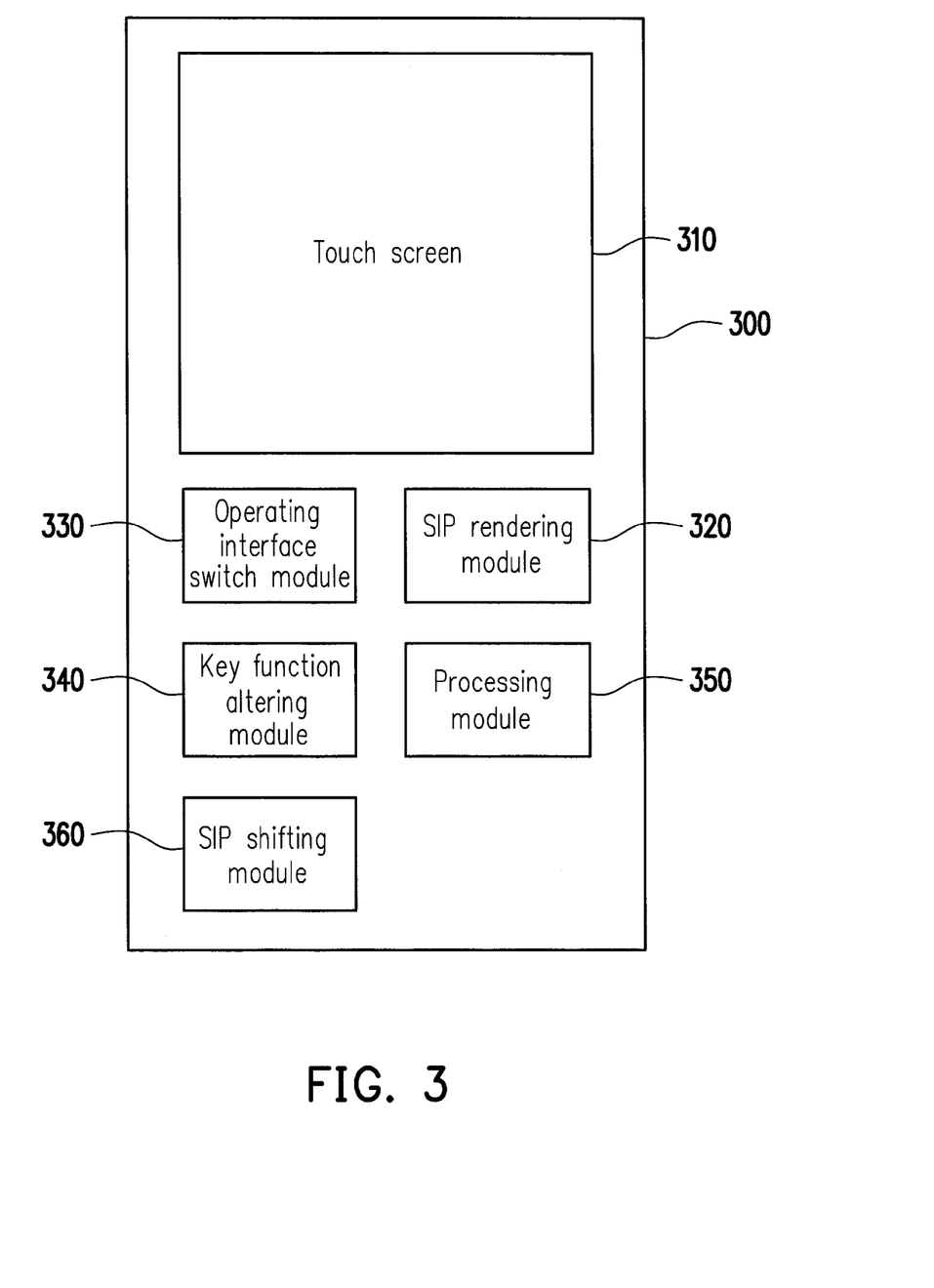
FIG. 3 is a block diagram of an apparatus for shifting a SIP according to an embodiment of the present invention.

FIG. 3 is a block diagram of an apparatus for shifting a SIP according to an embodiment of the present invention. Referring to FIG. 3, in the present embodiment, the apparatus 300 may be disposed in an electronic device, such as a cell phone, a PDA, a smartphone, or a computer, for switching an input word corresponding to each key of the SIP according to different operating interface of the electronic device.

The apparatus 300 includes a touch screen 310, a SIP rendering module 320, an operating interface switch module 330, a key function altering module 340, a processing module 350, and a SIP shifting module 360. The touch screen 310 is used for displaying various images, and other than that, the touch screen 310 is also used for detecting an instruction generated by a touch action of a user and accordingly served as an input interface of the electronic device. In one embodiment, the SIP rendering module 320 is a graphic processing unit (GPU) and the processing module 350 is a central processing unit (CPU) disposed in the apparatus 300. In another embodiments, the SIP rendering module 320 and the processing module 350 may be any combination of a CPU, a GPU, a programmable general-purpose or specific-purpose microprocessor, a digital signal processor (DSP), a programmable controller, application specific integrated circuits (ASIC), a programmable logic device (PLD), which are not limited herein. In yet another embodiments, the SIP rendering module 320, an operating interface switch module 330, a key function altering module 340, a processing module 350, and a SIP shifting module 360 are software modules, which may be included in the operating system (OS) of the apparatus 300, or included in one or more of the OS and applications of the apparatus 300, which are not limited herein. It is noted that functions of the SIP rendering module 320, the operating interface switch module 330, the key function altering module 340, and the processing module 350 are the same as or similar to those of the SIP rendering module 120, the operating interface switch module 130, the key function altering module 140, and the processing module 150 in the previous embodiment and therefore the details thereof are not repeated herein.

Figure 4:
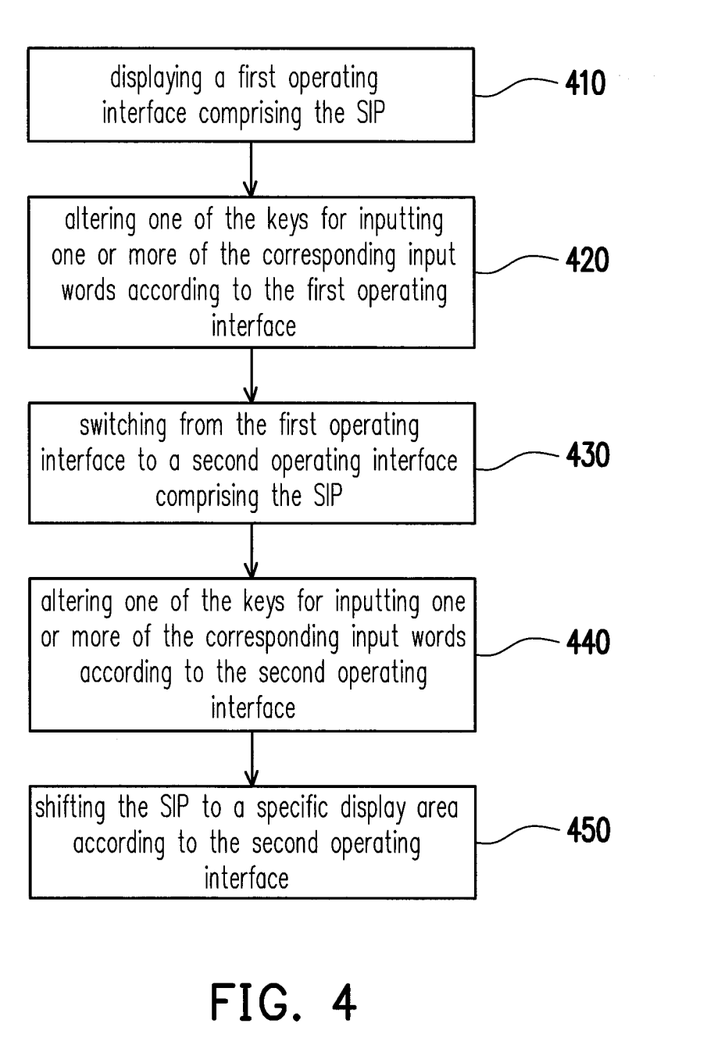
FIG. 4 is a flowchart of a method for shifting a SIP according to an embodiment of the present invention.

The differences from the previous embodiment lie in that, in the present embodiment, the SIP shifting module 360 is further incorporated to shift the SIP after the operating interface is switched. To be specific, FIG. 4 is a flowchart of a method for shifting a SIP according to an embodiment of the present invention. Referring to both FIG. 3 and FIG. 4, the method of the present embodiment is adapted to the apparatus 300, and detailed steps of the method of the present embodiment will be described with reference to each element of the apparatus 300 depicted in FIG. 3.

First, in step 410, a first operating interface comprising the SIP is displayed on the touch screen 310 by the SIP rendering module 320, in which the SIP rendering module 320 may display at least one input word corresponding to each of the keys in a key display area corresponding to the key, and the key function altering module 340 may alter one of the keys for inputting one or more of the corresponding input words according to the first operating interface when the first operating interface is displayed.

Then, in step 420, the operating interface of the electronic device 300 is switched from the first operating interface to a second operating interface comprising the SIP by the operating interface switch module 330. In detail, the operating interface switch module 330 may switches an executed application program, switches an input field of an executed application program, switches a function of an executed application program, or switches an executed operation mode of the electronic device 300, and the present invention is not limited thereto.

When the second operating interface is displayed, in step 430, one of the keys for inputting one or more of the corresponding input words is altered according to the second operating interface by the key function altering module 340.

It is noted that, besides altering the keys, in step 440, the SIP is further shifted to a specific display area according to the second operating interface by the SIP shifting module 360 when the second operating interface is displayed. In one embodiment, the specific display area may be determined according to a layout of the second operating interface. That is, the specific area may be an area of the second operating interface that is not displayed with information or an area that is displayed with less important information such as a lower area of the second operating interface. In another embodiment, the specific display area may be determined according to a location of an input field of the second operating interface. For example, if the input filed is displayed on the upper portion of the second operating interface, the specific display area may be defined as the lower portion of the second operating interface. If the input filed is displayed on the lower portion of the second operating interface, the specific display area may be defined as the upper portion of the second operating interface.

Figure 5:
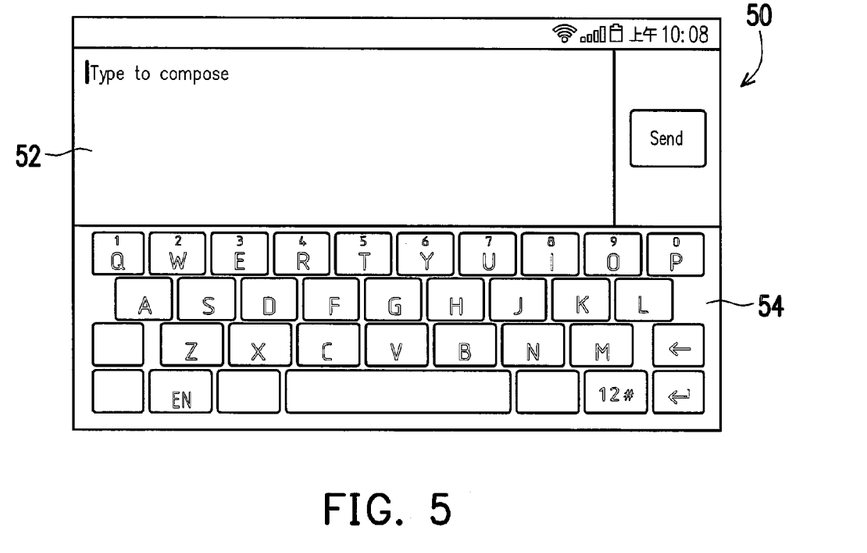
FIG. 5 is an example illustrating a method for shifting a SIP according to the operating interface according to an embodiment of the present invention.

For example, FIG. 5 is an example illustrating a method for shifting a SIP according to the operating interface according to an embodiment of the present invention. Referring to FIG. 5, the operating interface 50 is, for example, an interface of an instant messaging (IM) application executed by the electronic device, which includes an input field 52 and a SIP 54. When the electronic device switches to the operating interface 50, the input filed 52 is displayed on the upper portion of the operating interface 50. Meanwhile, the keys of the SIP 54 for inputting one or more of the corresponding input words are altered according to the operating interface 50 and may include, for example, alphabet keys and function keys to be inputted to the input filed 52. Further, according to the location of the input field 52 (i.e. the upper portion of the operating interface 50), the SIP 54 is shifted to the lower portion of the operating interface 50 so as to prevent the input field 52 from being blocked by the SIP 54 and facilitate user's input of messages.

It is noted the SIP may be shifted further so as to leave only a specific portion of the SIP on the specific display area without altering the quantity or the layout of the keys within the SIP.

Figure 6:
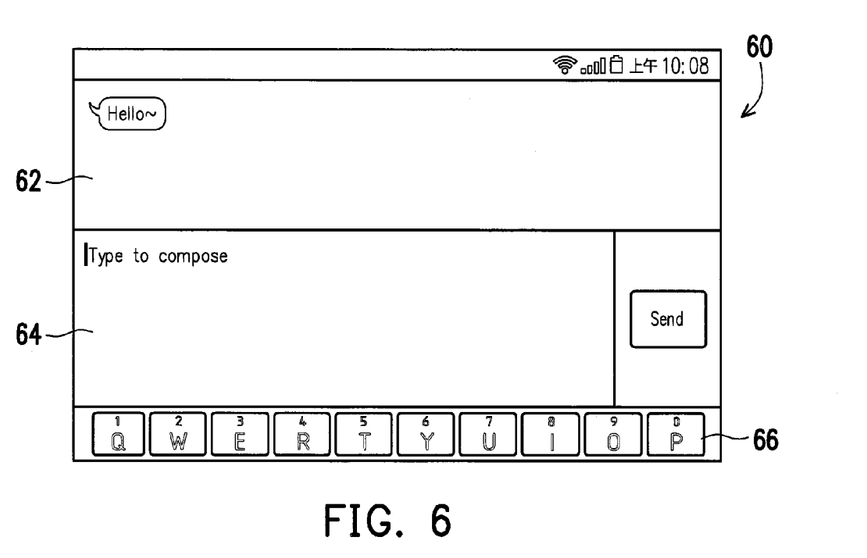
FIG. 6 is an example illustrating a method for shifting a SIP according to the operating interface according to an embodiment of the present invention.

For example, FIG. 6 is an example illustrating a method for shifting a SIP according to the operating interface according to an embodiment of the present invention. Referring to FIG. 6, the operating interface 60 is, for example, an interface of an IM application executed by the electronic device, which includes a message display area 62, an input field 64 and a SIP 66. When the electronic device switches to the operating interface 60, the message display area 62 is displayed on the upper portion of the operating interface 60 and the input field 64 is displayed on the middle portion of the operating interface 60. Meanwhile, the keys of the SIP 66 for inputting one or more of the corresponding input words are altered according to the operating interface 60 and may include, for example, alphabet keys and function keys to be inputted to the input filed 64. Further, according to the location of the input field 64 (i.e. the middle portion of the operating interface 60), the SIP 66 is further shifted downward (compared to the SIP 54 in FIG. 5) to leave only the upper row of the SIP 66 on the lower portion of the operating interface 60 so as to prevent the input field 64 from being blocked by the SIP 66 and facilitate user's input of messages. Further, the SIP 66 may be manually dragged out from the bottom of the operating interface 60 according to a gesture performed by a user such as double tap or drag, which is not limited herein.

Through aforesaid shifting of SIP, the important information or field (e.g. input field) of the operating interface which the user is looking at can keep displaying in the upper layout of the operating interface without being blocked by the SIP and therefore facilitate user's further operations such as input actions.

It is noted that, in one embodiment, while the SIP is shifted to the specific display area, the SIP may be further resized or deformed to fit the specific display area by the SIP shifting module without altering the quantity or the layout of the keys within the SIP.

Figure 7:
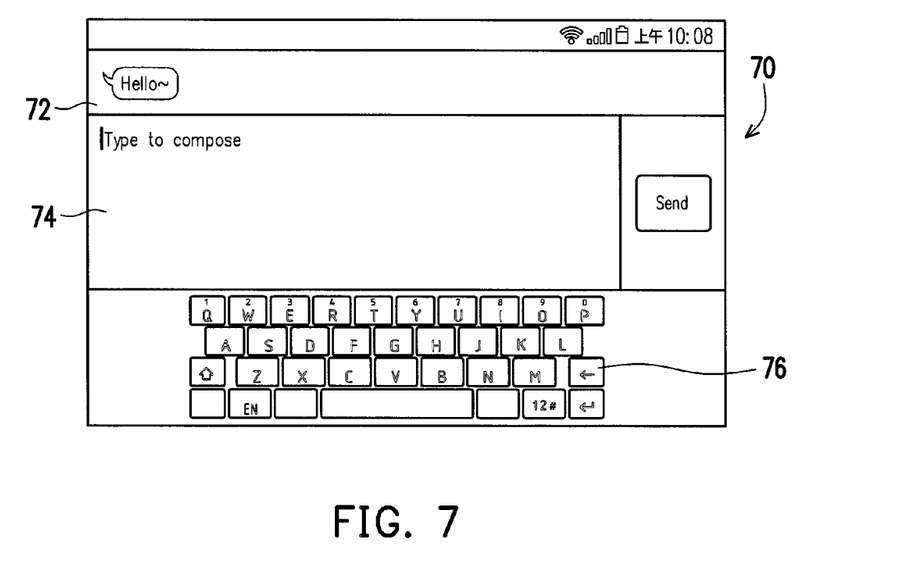
FIG. 7 is an example illustrating a method for shifting a SIP according to the operating interface according to an embodiment of the present invention.

For example, FIG. 7 is an example illustrating a method for shifting a SIP according to the operating interface according to an embodiment of the present invention. Referring to FIG. 7, the operating interface 70 is, for example, an interface of an IM application executed by the electronic device, which includes a message display area 72, an input field 74, and a SIP 76. When the electronic device switches to the operating interface 70, the message display area 72 is displayed on the upper portion of the operating interface 70 and the input field 74 is displayed next to the message display area 72 for users to type the messages. Similar to the SIP 54 of FIG. 5, the keys of the SIP 76 for inputting one or more of the corresponding input words are altered according to the operating interface 70 and may include, for example, alphabet keys and function keys to be inputted to the input filed 74. However, since a display area of the operating interface 70 is occupied by the message display area 72 and the input field 74, to prevent the input field 74 from being blocked by the SIP 76, the SIP 76 is reduced to a smaller size so as to fit the empty space in the lower portion of the operating interface 60. It is noted herein that, in one embodiment, the SIP 76 may be automatically enlarged or reduced to a different size according to the layout of the operating interface 70. Further, the SIP 76 may also be manually enlarged or reduced to a different size according to a gesture performed by a user such as double tap, drag, pinch in, or pinch out, which is not limited herein.

In another embodiment, while the SIP is shifted to the specific display area, a layout of the keys of the SIP may be altered to rearrange at least one key for inputting one or more corresponding input words in a specific portion of the SIP according to the second operating interface. The specific portion may be, for example, at least one upper row, at least one lower row, at least one left column, or at least one right column of the SIP, which is not limited herein.

Figure 8:
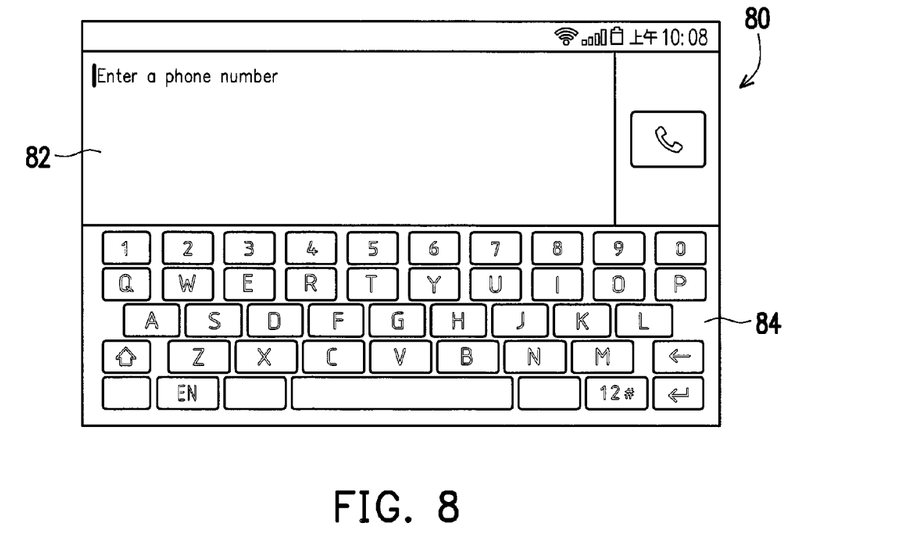
FIG. 8 is an example illustrating a method for shifting a SIP according to the operating interface according to an embodiment of the present invention.

For example, FIG. 8 is an example illustrating a method for shifting a SIP according to the operating interface according to an embodiment of the present invention. Referring to FIG. 8, the operating interface 80 is, for example, a phone dialing application executed by the electronic device, which includes an input field 82 and a SIP 84. When the electronic device switches to the operating interface 80, the input filed 82 is displayed on the upper portion of the operating interface 80. Similar to the SIP 54 of FIG. 5, the keys of the SIP 84 for inputting one or more of the corresponding input words are altered according to the operating interface 80. However, the differences between the SIP 54 and the SIP 84 lie in that the number keys are extracted from the alphabet keys "Q", "W", "E", "R", "T", "Y", "U", "I", "O", "P" and displayed on the upper row of the SIP 84, so as to facilitate user's input of phone number.

In yet another embodiment, while the SIP is shifted to the specific display area, a layout of the keys of the SIP may be altered to rearrange at least one key for inputting one or more corresponding input words in a specific portion of the SIP according to the second operating interface and the SIP may be further shifted so as to leave only the specific portion of the SIP on the specific display area.

Figure 9:
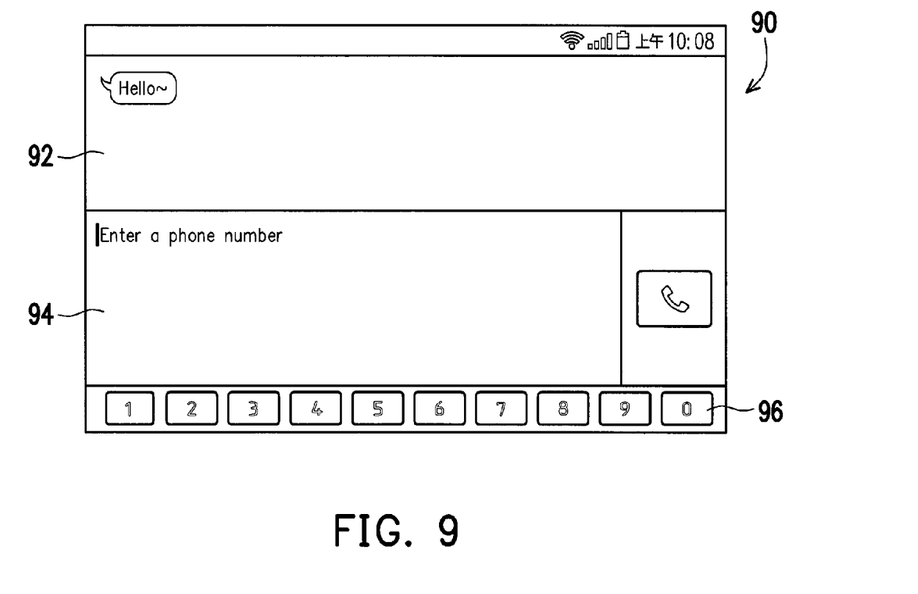
FIG. 9 is an example illustrating a method for shifting a SIP according to the operating interface according to an embodiment of the present invention.

For example, FIG. 9 is an example illustrating a method for shifting a SIP according to the operating interface according to an embodiment of the present invention. Referring to FIG. 9, the operating interface 80 is, for example, an IM application including a phone dialing function executed by the electronic device, which includes a message display area 92, an input field 84, and a SIP 96. When the electronic device switches to the operating interface 90, the input filed 92 is displayed on the upper portion of the operating interface 90. Similar to the SIP 84 of FIG. 8, the number keys are extracted from the alphabet keys "Q", "W", "E", "R", "T", "Y", "U", "I", "O", "P" and displayed on the upper row of the SIP 86. However, the differences between the SIP 84 and the SIP 96 lie in that the SIP 96 is further shifted downward to leave only the upper row (i.e. the number keys) of the SIP on the lower portion of the operating interface 90. It is noted herein that the aforesaid shift of SIP 96 may be automatically executed according to the type of characters expected to be entered to the input field 94 of the operating interface 90. For example, in the present embodiment, the characters expected to be entered to the input field 94 is the numbers and therefore the SIP 96 is shifted to leave only the number keys on the operating interface 90, so as to facilitate user's input of phone number.

It should be mentioned that the method described above for shifting a SIP may be executed in any electronic device having a processor. In other words, foregoing embodiment can be designed as a computer program containing a plurality of program codes, and the computer program is recorded in a computer-readable recording medium (for example, a CD, a floppy disk, or a removable hard disk). After loading the computer program into the electronic device, foregoing method for shifting the SIP can be executed in the electronic device.

As described above, the present invention provides a method and an apparatus for shifting a SIP and a recording medium thereof, wherein the input word corresponding to each key of the SIP is automatically altered according to the current operating interface of an electronic device, and at the same time, the number or layout of the keys of the SIP is not changed. Accordingly, when a user switches the operating interface of the electronic device, the keys are automatically switched to characters, strings, or symbols corresponding to the current operating interface. Thus, the user can quickly input a word corresponding to the operating interface by pressing one of the keys. Thereby, the input efficiency is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of shifting a software input panel (SIP) of an electronic device comprising:

displaying a first operating interface of an instant message application comprising the SIP and an input field, wherein the SIP comprises a plurality of keys, with a fixed number of keys and a fixed layout, wherein the first operating interface includes only an upper portion and a lower portion, wherein the input field is at the upper portion of the first operating interface, and the SIP is at the lower portion of the first operating interface, wherein the SIP has an arrangement of keys, and each key having a corresponding key value, for entering one or more input words into the input field according to the first operating interface;

in response to an incoming message received by the electronic device, switching from the first operating interface to a second operating interface of the instant message application comprising a shifted SIP, the input field, and a display field displaying the incoming message, wherein the shifted SIP only shows a partial portion of the SIP without altering the arrangement of the keys, wherein the second operating interface comprises an upper portion, a middle portion, and a lower portion, wherein the display field is at the upper portion of the second operating interface, the input field is at the middle portion of the second operating interface, and the shifted SIP is at the lower portion of the second operating interface, and wherein a location of the shifted SIP is based on the location of the input field of the second operation interface such that the input field is not blocked by the shifted SIP; and sliding the shifted SIP of the second operating interface to display a larger portion of the SIP without altering the arrangement of the keys in response to a drag operation detected on the partial portion of the SIP, wherein the larger portion is greater than the partial portion;

displaying a third operating interface of another application comprising the SIP and the input field in response to an operating interface switching command; and altering one or more keys of the SIP in response to the operating interface switching command without altering the arrangement of the keys, wherein each of the altered one or more keys of the SIP has an altered input key value for entering one or more input words into the input field according to the third operating interface.

2. The method according to claim 1, wherein the partial portion comprises at least one upper row, at least one lower row, at least one left column, or at least one right column of the SIP.

3. The method according to claim 1, wherein the step of switching from the first operating interface to the second operating interface comprises at least one of the following steps:

switching an executed application program;

switching the input field of an executed application program;

switching a function of an executed application program; and switching an executed operation mode.

4. The method according to claim 1, wherein the electronic device further comprises using a touch screen for receiving a key selecting instruction so as to select one of the keys.

5. The method according to claim 4, wherein the keys comprise a space key and the input words corresponding to the space key comprise at least a blank character and a domain name string, after the step of altering one of the keys for inputting one or more of the corresponding input words according to the second operating interface, the method further comprises:

receiving the key selecting instruction; and inputting the input word corresponding to the selected key at a cursor position of the electronic device, wherein the domain name string is inputted at the cursor position of the electronic device if the selected key is the space key.

6. An apparatus for shifting a software input panel (SIP), comprising:

a touch screen; and a processor, configured for:

displaying a first operating interface of an instant message application comprising the SIP and an input field, wherein the SIP comprises a plurality of keys, with a fixed number of keys and a fixed layout, wherein the first operating interface includes only an upper portion and a lower portion, wherein the input field is at the upper portion of the first operating interface, and the SIP is at the lower portion of the first operating interface, wherein the SIP has an arrangement of keys, and each key having a corresponding key value, for entering one or more input words into the input field according to the first operating interface;

in response to an incoming message received by the electronic device, switching from the first operating interface to a second operating interface of the instant message application comprising a shifted SIP, the input field, and a display field displaying the incoming message, wherein the shifted SIP only shows a partial portion of the SIP without altering the arrangement of the keys, wherein the second operating interface comprises an upper portion, a middle portion, and a lower portion, wherein the display field is at the upper portion of the second operating interface, the input field is at the middle portion of the second operating interface, and the shifted SIP is at the lower portion of the second operating interface, and wherein a location of the shifted SIP is based on the location of the input field of the second operation interface such that the input field is not blocked by the shifted SIP; and sliding the shifted SIP of the second operating interface to display a larger portion of the SIP without altering the arrangement of the keys in response to a drag operation detected on the partial portion of the SIP, wherein the larger portion is greater than the partial portion;

displaying a third operating interface of another application comprising the SIP and the input field in response to an operating interface switching command; and altering one or more keys of the SIP in response to the operating interface switching command without altering the arrangement of the keys, wherein each of the altered one or more keys of the SIP has an altered input key value for entering one or more input words into the input field according to the third operating interface.

7. The apparatus according to claim 6, wherein the partial portion comprises at least one upper row, at least one lower row, at least one left column, or at least one right column of the SIP.

8. The apparatus according to claim 6, wherein the processor is configured for switching an executed application program, switching the input field of an executed application program, switching a function of an executed application program, and switching an executed operation mode.

9. The apparatus according to claim 6, wherein the processor is further configured for:

receiving a key selecting instruction from the touch screen so as to select one of the keys, wherein the keys comprise a space key and the input words corresponding to the space key comprise at least a blank character and a domain name string; and inputting the input word corresponding to the selected key at a cursor position on the touch screen after receiving the key selecting instructing from the touch screen, wherein the domain name string is inputted at the cursor position of the electronic device if the selected key is the space key.

10. The apparatus according to claim 9, wherein the processor is further configured for:

displaying the SIP on the touch screen and displaying at least one input word corresponding to each of the keys in a key display area corresponding to the key, wherein a surface area and a shape of the key display area are kept unchanged when the SIP rendering module displays at least one input word corresponding to each of the keys.

11. A non-transitory recording medium, for recording a computer program, wherein the computer program comprises a plurality of program codes and is loaded into an electronic device to allow the electronic device to execute a method for shifting a SIP, wherein the method comprises:

displaying a first operating interface of an instant message application comprising the SIP and an input field, wherein the SIP comprises a plurality of keys, with a fixed number of keys and a fixed layout, wherein the first operating interface includes only an upper portion and a lower portion, wherein the input field is at the upper portion of the first operating interface, and the SIP is at the lower portion of the first operating interface, wherein the SIP has an arrangement of keys, and each key having a corresponding key value, for entering one or more input words into the input field according to the first operating interface;

in response to an incoming message received by the electronic device, switching from the first operating interface to a second operating interface of the instant message application comprising a shifted SIP, the input field, and a display field displaying the incoming message, wherein the shifted SIP only shows a partial portion of the SIP without altering the arrangement of the keys, wherein the second operating interface comprises an upper portion, a middle portion, and a lower portion, wherein the display field is at the upper portion of the second operating interface, the input field is at the middle portion of the second operating interface, and the shifted SIP is at the lower portion of the second operating interface, and wherein a location of the shifted SIP is based on the location of the input field of the second operation interface such that the input field is not blocked by the shifted SIP; and sliding the shifted SIP of the second operating interface to display a larger portion of the SIP without altering the arrangement of the keys in response to a drag operation detected on the partial portion of the SIP, wherein the larger portion is greater than the partial portion;

displaying a third operating interface of another application comprising the SIP and the input field in response to an operating interface switching command; and altering one or more keys of the SIP in response to the operating interface switching command without altering the arrangement of the keys, wherein each of the altered one or more keys of the SIP has an altered input key value for entering one or more input words into the input field according to the third operating interface.

* * * * *